Oct. 28, 1941.   J. R. MUDGE   2,260,395
THERMAL COIL FOR GAS TANKS
Filed July 31, 1939   2 Sheets-Sheet 1
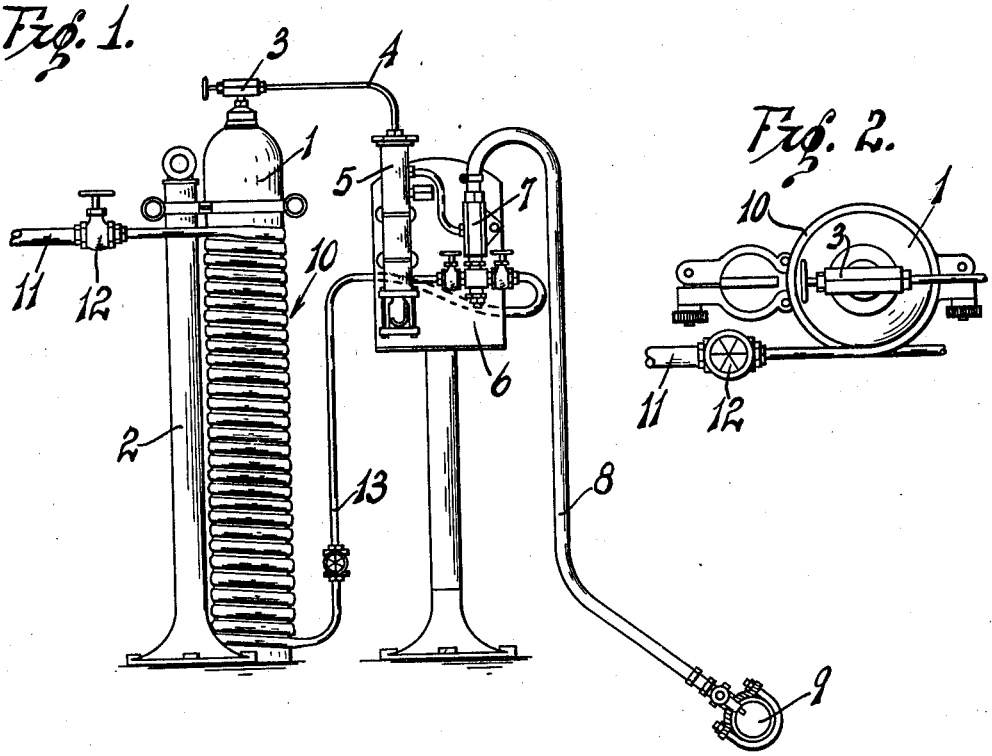
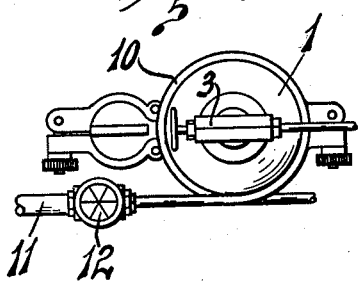
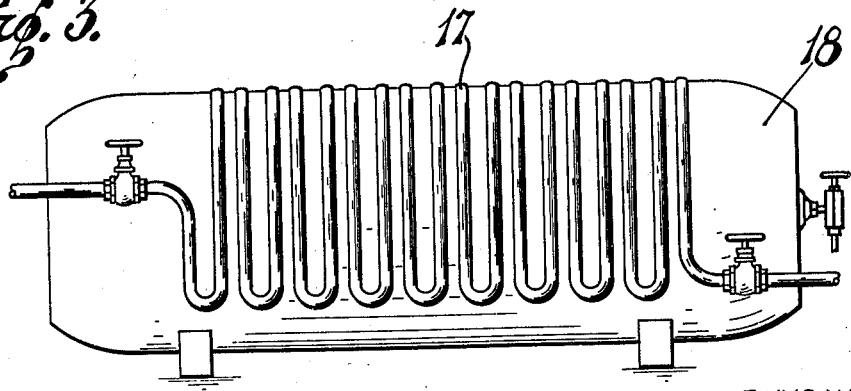
INVENTOR.
JOHN R. MUDGE.
BY
ATTORNEY.

INVENTOR.
JOHN R. MUDGE.
BY.
ATTORNEY.

Patented Oct. 28, 1941

2,260,395

UNITED STATES PATENT OFFICE 2,260,395

THERMAL COIL FOR GAS TANKS

John R. Mudge, Los Angeles, Calif.

Application July 31, 1939, Serial No. 287,430

2 Claims. (Cl. 62—1)

This invention relates to a thermal coil for gas tanks or containers, whereby the temperature of the tank may be maintained at a determined point, or the temperature of the tank may be increased or decreased, if necessary, to comply with various conditions under which the tank may be used.

An object of my invention is to provide a conduit around the gas tank, and then pass water or other liquid through the coil, whereby the temperature of the tank and its contained gas may be controlled.

A feature of my invention resides in the simple means whereby the gas tank may be either cooled or heated, so that the pressure of the gas within the tank can be maintained substantially constant.

Another feature of my invention resides in the maintaining of a constant quantity of gas delivered from the tank, this constant delivery being obtained through the thermal coil which surrounds or partially surrounds the tank of gas, thus maintaining constant temperature and pressure of the gas within the tank.

Another object of my invention is to provide a novel thermal coil for chlorine tanks, the water which passes through the coil being then directed to the injector, which forces a quantity of chlorine passing into the swimming pool, or the like.

Other objects, advantages and features of invention may appear from the accompanying drawings, the subjoined detailed description, and the appended claims.

In the drawings:

Figure 1 is a side elevation of my thermal coil arranged on a gas tank.

Figure 2 is a top plan view of the gas tank with my thermal coil surrounding the same.

Figure 3 is a side elevation of a larger type of gas tank, with the thermal coil partially surrounding this tank.

Figure 4:
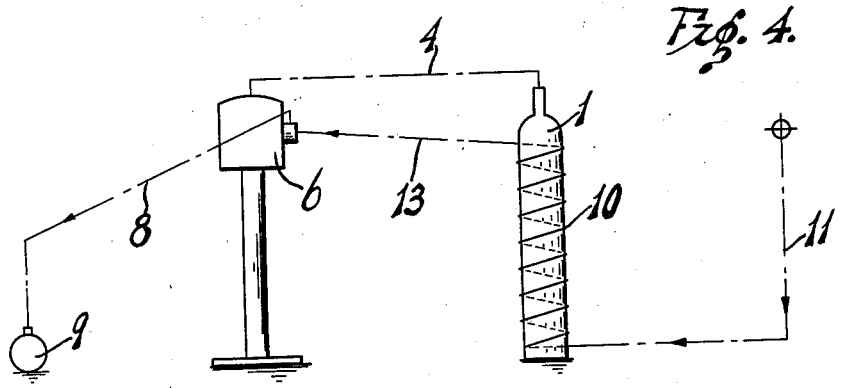
Figure 4 is a diagrammatic, side elevation of one system of directing the flow of water through the thermal coil.

Referring more particularly to the drawings, the numeral 1 indicates the gas tank or cylinder containing a quantity of chlorine or other gas under pressure. This gas tank is supported in a vertical position by clamping the same to an anchor post 2. A rate of flow control valve 3 on the cylinder 1 determines the amount of chlorine gas which passes into the pipe 4. This pipe extends into the pulsation chamber 5 of the injector 6. The injector may be of the type shown in United States Patent No. 1,514,939, dated November 11, 1924. The injector pump 7 forces the chlorine or other gas into the pipe 8, and thence into the conduit 9, which extends to the swimming pool. It is understood that my invention is particularly applicable to the chlorinating apparatus of a swimming pool. The injector pump 7 is of the type actuated by water under pressure, and reciprocation of this pump forces a gas into the supply line to the swimming pool. The detailed construction of the injector 6 is usual and well-known, and forms no part of this invention.

It is obvious that if the temperature of the tank or cylinder 1 varies, then the pressure of the gas in the tank will vary, and consequently the amount of gas which subsequently passes into the conduit 9 will not be accurately determinable. In order that the quantity of gas which passes to the injector 6 may be constant, I provide a thermal coil 10, which surrounds or partially surrounds the tank or cylinder 1. The coil 10 is a pipe coil, and by passing water or other liquid through this coil, the temperature of the cylinder 1, and its contained gas, can be maintained at a predetermined temperature. As the quantity of gas in the tank decreases, the temperature of the water, or the like, flowing through the coil 10 may be increased. Thus, the gas in the tank 1 will be expanded until the pressure is again substantially the same as when the tank was completely filled.

As shown in Figure 4, a pipe 11 extends from the water main, or other source of water supply, under pressure, and the amount of water which passes into the coil 10 is controlled by the valve 12 in the pipe 11. After passing through the coil 10, the water then passes into the pipe 13, which extends to the water injector pump 7, and is there used to actuate this injector to force the gas into the conduit 9 in the usual and well-known manner.

Figure 5:
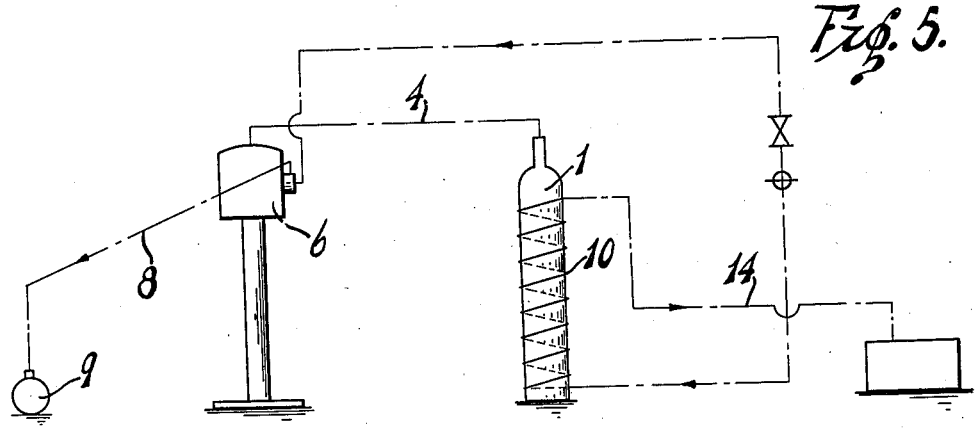
Figure 5 is a diagrammatic side elevation of a modified form of directing the water through the thermal coil.

As shown in Figure 5, the water, after passing through the coil 10, can be directed into a sump or sewer through the pipe 14 instead of actuating the injector pump of the injector. With this arrangement, the water can also be heated or cooled through some usual and well-known apparatus.

Figure 6:
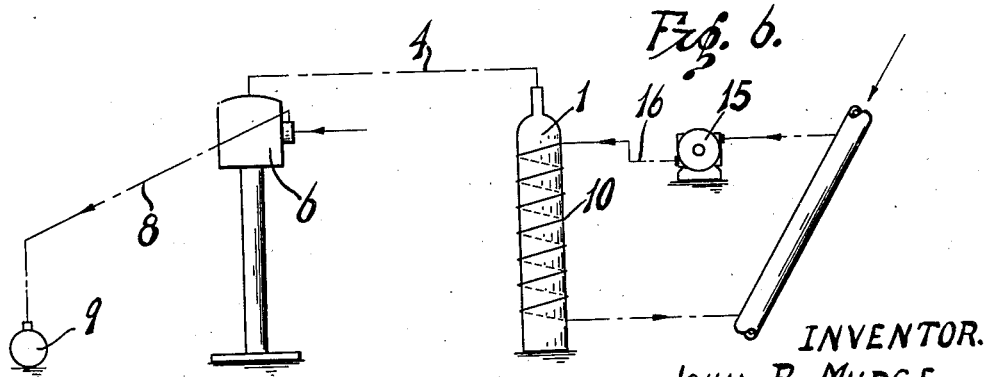
Figure 6 is a side elevation of still another means of directing water through the thermal coil.

As shown in Figure 6, a pump 15 can be set in the intake line 16 to circulate water through the coil 10. The exhaust water can be directed either back into the main supply line or can be wasted, as desired.

As shown in Figure 3, the thermal coil 17 can partially surround a large tank or drum of chlorine or other gas 18. The means of controlling the water which passes through this coil, or the temperature of that water, is the same as that previously described.

Having described my invention, I claim:

1. A thermal coil for maintaining the temperature of a chlorine tank, comprising a pipe coil surrounding the tank on the outside thereof, intake and outlet pipes on said coil, an injector connected to the chlorine tank, an injector pump on the injector, the outlet pipe from the coil extending into said injector pump, to actuate the pump.

2. A thermal coil for maintaining the temperature of chlorine tanks, comprising a pipe coil surrounding the chlorine tank on the outside thereof and extending substantially the length of the chlorine tank, and means to circulate water through said coil, the temperature of the water being maintained at a predetermined point determined by the amount of pressure desired in the chlorine tank, an injector receiving chlorine from the chlorine tank, an injector pump on the injector, an outlet pipe of the thermal coil extending to the injector pump of the injector, whereby said pump is actuated.

JOHN R. MUDGE.